United States Patent
Son et al.

(10) Patent No.: US 9,004,293 B2
(45) Date of Patent: Apr. 14, 2015

(54) SEMI-PERMEABLE FILM AND SEPARATION MEMBRANE INCLUDING NANOPOROUS MATERIAL, AND METHOD OF MANUFACTURING THE SAME

(71) Applicant: Samsung Electronics Co., Ltd., Suwon-Si, Gyeonggi-Do (KR)

(72) Inventors: You Hwan Son, Seoul (KR); Hye Young Kong, Uijeongbu-si (KR); Sung Soo Han, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 88 days.

(21) Appl. No.: 13/716,997

(22) Filed: Dec. 17, 2012

(65) Prior Publication Data
US 2013/0153489 A1 Jun. 20, 2013

(30) Foreign Application Priority Data
Dec. 16, 2011 (KR) .................. 10-2011-0136825

(51) Int. Cl.
*B01D 39/00* (2006.01)
*B01D 39/14* (2006.01)
(Continued)

(52) U.S. Cl.
CPC ............ *B01D 71/024* (2013.01); *B01D 61/025* (2013.01); *B01D 67/0079* (2013.01);
(Continued)

(58) Field of Classification Search
CPC ............ B01D 71/024; B01D 67/0039; B01D 67/0079; B01D 69/148; B01D 69/125; B01D 71/56; B01D 61/025; B01D 69/141; B01D 71/028; B01D 2239/0407; B01D 69/12; B01D 2239/065; B01D 71/027; B01D 53/228; B01D 69/147; B01D 1/024; B01D 71/68
USPC ............... 210/500.27, 502.1, 500.38, 500.41, 210/500.39, 500.21; 427/255, 245, 212, 427/215; 428/403, 405
See application file for complete search history.

(56) References Cited

U.S. PATENT DOCUMENTS 6,500,233 B1    12/2002   Miller et al.
8,038,887 B2 *  10/2011   Bakajin et al. ............... 210/652
(Continued)

FOREIGN PATENT DOCUMENTS

KR     19980069234 A    10/1998
KR     19990058655 A    7/1999
(Continued)

OTHER PUBLICATIONS

Han, Runping, et al. "Characterization and properties of iron oxide-coated zeolite as adsorbent for removal of copper (II) from solution in fixed bed column." Chemical Engineering Journal 149.1 (2009): 123-131.*

(Continued)

*Primary Examiner* — Ana Fortuna
(74) *Attorney, Agent, or Firm* — Harness, Dickey & Pierce, P.L.C.

(57) ABSTRACT

A semi-permeable film includes a nanoporous material and a polymer matrix. The nanoporous material includes a nanoporous core and a coating layer that is disposed on a surface of the nanoporous core. The coating layer may include a particle selected from a metal hydroxide particle, a metal oxide particle, and a combination thereof. A separation membrane may include the semi-permeable film. Example embodiments also relate to a method of manufacturing the semi-permeable film and the separation membrane.

27 Claims, 4 Drawing Sheets

(51) Int. Cl.
| | |
|---|---|
| B05D 5/00 | (2006.01) |
| B05D 3/12 | (2006.01) |
| B01D 71/02 | (2006.01) |
| B01D 67/00 | (2006.01) |
| B01D 69/14 | (2006.01) |
| C02F 1/44 | (2006.01) |
| B01D 61/02 | (2006.01) |
| B01D 71/56 | (2006.01) |
| B01D 71/58 | (2006.01) |

(52) U.S. Cl.
CPC .............. *B01D69/148* (2013.01); *B01D 71/56* (2013.01); *B01D 71/58* (2013.01); *B01D 67/0039* (2013.01); *C02F 1/44* (2013.01); *B01D 67/0006* (2013.01); B01D 2325/36 (2013.01)

(56) References Cited

U.S. PATENT DOCUMENTS

| | | | |
|---|---|---|---|
| 2003/0114298 | A1 | 6/2003 | Woodhead et al. |
| 2005/0263456 | A1 | 12/2005 | Cooper et al. |
| 2006/0093544 | A1* | 5/2006 | Sheen et al. .................. 423/337 |
| 2007/0284303 | A1* | 12/2007 | Drew et al. .................. 210/505 |
| 2008/0237126 | A1 | 10/2008 | Hoek et al. |
| 2009/0272692 | A1 | 11/2009 | Kurth et al. |
| 2010/0062156 | A1* | 3/2010 | Kurth et al. .................. 427/243 |
| 2010/0093879 | A1 | 4/2010 | Lloyd et al. |
| 2010/0304143 | A1* | 12/2010 | Seeber et al. .................. 428/404 |
| 2011/0005997 | A1 | 1/2011 | Kurth et al. |
| 2011/0027599 | A1* | 2/2011 | Hoek et al. .................. 428/476.3 |

FOREIGN PATENT DOCUMENTS

| | | |
|---|---|---|
| KR | 20010056165 A | 7/2001 |
| KR | 20010103389 A | 11/2001 |
| KR | 100857352 B1 | 9/2008 |
| KR | 100946214 B1 | 3/2010 |
| KR | 20100116983 A | 11/2010 |
| KR | 20110054263 A | 5/2011 |
| WO | WO 2006/098872 | 9/2006 |
| WO | WO-2008057842 A2 | 5/2008 |
| WO | WO 2008/112745 | 9/2008 |
| WO | WO 2009/008556 | 1/2009 |
| WO | WO 2009/129354 | 10/2009 |

OTHER PUBLICATIONS

Zou, et al., "Kinetic study of adsorption of Cu(II) and Pb(II) from aqueous solutions using manganese oxide coated zeolite in batch mode", Colloids and Surfaces A, Physicochemical and Engineering Aspects 279, Elsevier, May 15, 2006, pp. 238-246.

European Search Report, dated Apr. 24, 2013, issued in European Patent Application No. 12197470.3.

Fathizadeh et . al. "Effect of added NaX nano-zeolite into polyamide as a top thin layer of membrane on water flux and salt rejection in a reverse osmosis process." *Journal of Membrane Science* (2011) 88-95.

Lind et al. "Tailoring the Structure of Thin Film Nanocomposite Membranes to Achieve Seawater RO Membrane Performance" *Environmental Science & Technology*, 44(21) 8230-8235 (2010).

Lind, Ghosh, et al. "Influence of Zeolite Crystal Size on Zeolite-Polyamide Thin Film Nanocomposite Membranes." *Lamgmuir*, 25(17),10139-10145 (2009).

Kim et al. "Fabrication of polyamide thin-film nano-composite (PA-TFN) membrane with hydrophilized ordered mesoporous carbon (H-OMC) for water purifications" *Journal of Membrane Science*, 375 46-54 (2011).

Lee et al. "Polyamide thin-film nanofiiltration membranes containing TiO2 nanoparticles" *Desalination*, 219, 48-56, (2008).

Kwak et al. "Hybrid Organic/Inorganic Reverse Osmosis (RO) Membrane for Bactericidal Anti-Fouling. 1. Preparation and Characterization of TiO2 Nanoparticle Self-Assembled Aromatic Polyamide Thin-Film-Composite (TFC) Membrane" *Environmental Science & Technology* 35, 2388-2394 (2001).

Lee, Kim et al. "Silver nanoparticles immobilized on thin film composite polyamide membrane: characterization, nanofiltration, antifouling properties" *Polymers for Advanced Technologies*, 18, 562-568 (2007).

Singh et al. "Characterization of physical structure of silica nanoparticles encapsulated in polymeric structure of polyamide films" *Journal of Colloid and Interface Science*, 326, 176-185 (2008).

Jadav et al. "Synthesis of novel silica-polyamide nanocomposite membrane with enhanced properties" *Journal of Membrane Science*, 328, 257-267 (2009).

Jeong et al. "Interfacial polymerization of thin film nanocomposites: A new concept for reverse osmosis membranes" *Journal of Membrane Science*, 294, 1-7 (2007).

Pendergast et al. "Using nanocomposite materials technology to understand and control reverse osmosis membrane compaction" *Desalination*, 261, 255-263 (2010).

Peng et al. "Transport, structural, and interfacial properties of poly (vinyl alcohol)-polysulfone composite nanofiltration membranes" *Journal of Membrane Science*, 353, 169-176 (2010).

* cited by examiner

SEMI-PERMEABLE FILM AND SEPARATION MEMBRANE INCLUDING NANOPOROUS MATERIAL, AND METHOD OF MANUFACTURING THE SAME

CROSS-REFERENCE TO RELATED APPLICATIONS

This application claims priority under 35 U.S.C. §119 to Korean Patent Application No. 10-2011-0136825, filed in the Korean Intellectual Property Office on Dec. 16, 2011, the entire contents of which are incorporated herein by reference.

BACKGROUND

1. Field

Example embodiments herein relate to a semi-permeable film and a separation membrane including a nanoporous material, and a method of manufacturing the same.

2. Description of the Related Art

To acquire fresh water or gray water from sea water or sewage and waste water, suspended or dissolved components should be removed in conformity with the standards for drinking water. At present, reverse osmosis is conventionally used as a water treatment method for desalinating or making gray water out of sea water or sewage and waste water.

According to the water treatment method using a reverse osmotic membrane, a pressure corresponding to an osmotic pressure caused by dissolved components is applied to the raw water to separate a dissolved component, such as a salt (NaCl), from water. For example, the concentration of the salt dissolved in sea water ranges from about 30,000 to about 45,000 ppm and the osmotic pressure caused from the concentration ranges from about 20 atm to about 30 atm. As a result, a pressure of about 20 atm to about 30 atm or higher is applied to the raw water to produce fresh water from the raw water. Generally, energy in the amount of about 6 kW/m³ to about 10 kW/m³ is required to produce about 1 m³ of fresh water from sea water.

Recently, an energy recollection device has been developed and applied in an attempt to save the energy consumed during a reverse osmosis process. However, in this case, about 3 kW/m³ of energy is still required to drive a motor of a high-pressure pump.

To resolve the problem, a water treatment process using a forward osmosis separation membrane has been suggested as an alternative. The forward osmosis process is relatively economical compared with the reverse osmosis process, because the forward osmosis process does not require pressure but uses a natural osmosis phenomenon. As a result, researchers have been studying the development of the forward osmosis separation membrane.

Researchers tried to improve a salt rejection rate and an elution rate (or a permeation flux) by introducing inorganic particles into the separation membrane during the reverse osmosis or forward osmosis process. Although the introduction of the inorganic particle may improve the elution rate, the salt rejection rate is decreased, thus serving as a restrictive factor.

SUMMARY

Various embodiments relate to a semi-permeable film having higher selectivity and permeability as well as improved performance with regard to a salt rejection rate and an elution rate.

Various embodiments relate to a separation membrane including the semi-permeable film.

Various embodiments relate to a method of manufacturing the separation membrane.

According to a non-limiting embodiment, a semi-permeable film may include a nanoporous material and a polymer matrix. The nanoporous material includes a nanoporous core (also referred to herein as a nanoporous core compound) and a coating layer that is disposed on a surface of the nanoporous core. The coating layer may include a particle selected from a metal hydroxide particle, a metal oxide particle, and a combination thereof.

The nanoporous core compound may be selected from zeolite, hydrotalcite, kaohnite, mellite, montmorillonite, saponite, and a combination thereof.

The zeolite may be selected from zeolite-A, ZSM-5, zeolite-X, zeolite-Y, zeolite-L, LTA (Linde type A) zeolite, RHO zeolite, PAU zeolite, KFI zeolite, and a combination thereof.

The zeolite may be represented by $M^{m+}_{x/m}[Si_{1-x}Al_xO_2]\cdot yH_2O$, wherein $M^{m+}$ is a cation having a valence of m, for example a Group 1 metal ion or a Group 2 metal ion, x is greater than about 0 and less than or equal to about 1, and y represents the number of molecules of adsorbed water per unit cell, and is a natural number of greater than about 0. In one non-limiting embodiment, the zeolite may be represented by $Na_a[(AlO_2)_a(SiO_2)_b]\cdot yH_2O$, wherein b/a is greater than or equal to about 1, and y is the number of water molecules per unit cell.

The nanoporous core compound may include a nanopore having an average pore size of about 0.3 nm to about 1.24 nm.

The nanoporous core compound may have a particle diameter of about 50 nm to about 400 nm (e.g., an average largest particle diameter when the nanoporous core compound does not have a spherical shape).

The nanoporous material may include a nanopore having an average pore size of about 0.3 nm to about 1.2 nm.

The nanoporous material may have a surface charge of about −30 mV to about −50 mV at a pH of 8.4.

The nanoporous material may have a specific surface area of about 11 m²/g to about 626 m²/g.

The particle selected from a metal hydroxide particle, a metal oxide particle, and a combination thereof may be coated in an amount of about 0.01 mole to about 0.1 mole based on 1 mole of the nanoporous core compound.

The metal hydroxide particle or metal oxide particle may be represented by $M_x(OH)_y$, $MO(OH)_y$, or $M_xO_y$, wherein M is a Group 13 element of the periodic table (IUPAC) selected from Ga, In, Tl, and a combination thereof; a Group 14 element of the periodic table (IUPAC) selected from Si, Ge, Sn, and a combination thereof; a transition element selected from Mn, Fe, V, Co, Ni, Cu, Zn, Ti, and a combination thereof; and a combination thereof, and x and y are determined by a valence of M.

According to a non-limiting embodiment, the nanoporous material may be included in an amount of about 0.01 to about 8 wt % based on the total weight of the semi-permeable film. According to another non-limiting embodiment, the nanoporous material may be included in an amount of about 0.1 to about 5 wt % based on the total weight of the semi-permeable film.

The polymer matrix may include a polymer selected from polyamide, cross-linked polyamide, polyamide-hydrazide, poly(amide-imide), polyimide, poly(allylamine)hydrochloride/poly(sodium styrenesulfonate) (PAH/PSS), polybenzimidazole, sulfonated poly(arylene ethersulfone), and a combination thereof.

The semi-permeable film may have a surface charge of about −20 mV to about −35 mV at a pH of 8.4.

The semi-permeable film may further include an additive selected from a metal, metal oxide, and a mixture thereof. The metal may be selected from a Group 13 element of the periodic table (IUPAC) selected from Ga, In, Tl, and a combination thereof; a Group 14 element of the periodic table (IUPAC) selected from Si, Ge, Sn, and a combination thereof; a transition element selected from Mn, Fe, V, Co, Ni, Cu, Zn, Ti, and a combination thereof; and a combination thereof. The metal oxide may be oxides of the foregoing metals. The additive may be included in an amount of about 0.001 to about 0.1 mole based on 1 mole of the nanoporous material.

According to another non-limiting embodiment, a separation membrane may include the semi-permeable film.

The separation membrane may have a surface charge of about −20 mV to about −35 mV at a pH of 8.4.

The separation membrane may further include a woven fabric or a non-woven fabric including a polymer fiber supporting the semi-permeable film.

The separation membrane may further include a porous support supporting the semi-permeable film. The porous support may include a polymer selected from a polysulfone-based polymer, a poly(meth)acrylonitrile polymer, a polyolefin-based polymer, polycarbonate; polyalkylene terephthalate; a polyimide-based polymer; a polybenzimidazole-based polymer; a polybenzthiazole-based polymer; a polybenzoxazole-based polymer; a polyepoxy-based polymer; a polyphenylenevinylene-based polymer; a polyamide-based polymer; a cellulose-based polymer; polyvinylidene fluoride (PVDF); polytetrafluoroethylene (PTFE); polyvinylchloride (PVC), and a combination thereof.

According to another non-limiting embodiment, a method of manufacturing a separation membrane may include preparing a nanoporous material including a nanoporous core and a coating layer that is disposed on a surface of the nanoporous core compound, the coating layer including a particle selected from a metal hydroxide particle, a metal oxide particle, and a combination thereof; first coating a substrate with a first solution including a first monomer dissolved in a first solvent to obtain a first coated substrate; second coating the first coated substrate with a second solution including a second monomer dissolved in a second solvent (wherein the second solvent has non-miscibility with the first solvent); and performing interface polymerization of the first monomer and the second monomer to form a polymer matrix including the nanoporous material dispersed therein, thereby obtaining the separation membrane. At least one of the first solution and the second solution includes the nanoporous material.

The nanoporous material may be manufactured by a method that includes dispersing a precursor for the particle selected from a metal hydroxide particle, a metal oxide particle, and a combination thereof, and a nanoporous core compound in a solvent to prepare a mixture; adding a solution including a pH controlling agent dissolved therein to the mixture in a dropwise fashion to form a resulting material; and separating the resulting material followed by drying to obtain the nanoporous core compound coated with the metal hydroxide particle, or separating the resulting material followed by drying and heat-treating to obtain the nanoporous core compound coated with the metal oxide particle.

The precursor for the particle selected from a metal hydroxide particle, a metal oxide particle, and a combination thereof may be a salt of a metal selected from a Group 13 element, a Group 14 element, a transition element, and a combination thereof.

The nanoporous core compound may be the same as described in connection with the semi-permeable film.

The substrate may be a glass plate or a woven fabric or a non-woven fabric including a polymer fiber.

The substrate may be a porous support including a polymer selected from a polysulfone-based polymer, a poly(meth)acrylonitrile polymer, a polyolefin-based polymer, polycarbonate; polyalkylene terephthalate; a polyimide-based polymer; a polybenzimidazole-based polymer; a polybenzthiazole-based polymer; a polybenzoxazole-based polymer; a poly epoxy-based polymer; a polyphenylenevinylene-based polymer; a polyimide-based polymer; a cellulose-based polymer; polyvinylidene fluoride (PVDF); polytetrafluoroethylene (PTFE); polyvinylchloride (PVC); and a combination thereof.

The separation membrane may be separation membrane for water treatment selected from a microfiltration membrane, an ultrafiltration membrane, a nanofiltration membrane, a reverse osmotic membrane, and a forward osmotic membrane.

DETAILED DESCRIPTION

Figure 1:
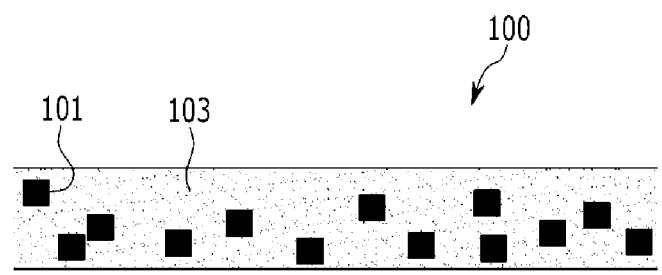
FIG. 1 is a schematic view of a semi-permeable film according to a non-limiting embodiment.

This disclosure will be described more fully hereinafter with reference to the accompanying drawings, in which various example embodiments are shown. This disclosure may, however, be embodied in many different forms and is not to be construed as limited to the example embodiments set forth herein.

In the drawings, the thickness of layers, films, panels, regions, etc., may have been exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the term "combination" may refer to a mixture, a stacking structure, or an alloy of the listed components.

As used herein, the term "metal" may refer to a semiconductor element (semi-metal) as well as a conductive element.

As used herein, the term "poly(meth)acrylonitrile polymer" may refer to a polyacrylonitrile polymer and a polymethacrylonitrile polymer.

According to a non-limiting embodiment, a semi-permeable film includes a nanoporous material and a polymer matrix. The nanoporous material may include a nanoporous core compound (also referred to herein as a nanoporous core) and a coating layer that is disposed on a surface of the nanoporous core compound. The coating layer may include a particle selected from a metal hydroxide particle, a metal oxide particle, and a combination thereof.

The nanoporous core compound may be selected from zeolite, hydrotalcite, kaohnite, mellite, montmorillonite, saponite, and a combination thereof.

The zeolite may be selected from zeolite-A, ZSM-5 (Zeolite Socony Mobil-5), zeolite-X, zeolite-Y, zeolite-L, LTA (Linde type A) zeolite, RHO zeolite, PAU (Paulingite) zeolite, KFI (ZK-5) zeolite, and a combination thereof.

The zeolite may be represented by $M^{m+}_{x/m}[Si_{1-x}Al_xO_2] \cdot yH_2O$, wherein $M^{m+}$ is a cation having a valence of m, for example a Group 1 metal ion or a Group 2 metal ion, x is greater than 0 and less than or equal to about 1, and specifically ranges from about 0.25 to about 0.38, and y represents the number of molecules of adsorbed water per unit cell, and is a natural number of greater than 0. The zeolite may further include other elements in a zeolite lattice, other than $Si^{4+}$ and $Al^{3+}$. In a non-limiting embodiment, the zeolite may be represented by $Na_a[(AlO_2)_a(SiO_2)_b] \cdot yH_2O$, wherein b/a is greater than or equal to about 1, specifically $1.6 \leq b/a \leq 3$. y is the number of water molecules per unit cell and is a natural number of greater than about 0, specifically about 1 to 20, and more specifically about 2 to 10.

The zeolite may increase the hydrophilicity of the separation membrane and thereby increase the elution rate.

The nanoporous core compound may include a nanopore having an average pore size of about 0.3 nm to about 1.24 nm. When the nanoporous core compound having an average pore size of the above range is applied to the separation membrane, the salt rejection rate may be improved.

The nanoporous core compound may have a particle diameter of about 50 nm to about 400 nm (e.g., an average largest particle diameter when the nanoporous core compound does not have a spherical shape). When the nanoporous core compound has the above particle diameter, the nanoporous core compound is dispersed relatively well and immersed in a polymer matrix.

The nanoporous material may include a nanopore having an average pore size of about 0.3 nm to about 1.2 nm. When the nanoporous material having an average pore size of the above range is applied to a separation membrane, the salt rejection rate may be improved.

The coating layer may include the particle selected from a metal hydroxide particle, metal oxide particle, and a combination thereof. The coating layer is present on the surface of the nanoporous core compound. Since the particle of the coating layer may exist on the surface of the nanoporous core compound or the surface inside the pores, the particle of the coating layer may coat the entirety or a part of the nanoporous core compound. The particle of the coating layer may be of several nanometers to tens of nanometers in diameter. Although the nano size of the particle is not limited specifically, the particle may have a particle diameter ranging from about 50 nm to about 400 nm.

The surface charge (e.g., negative (−) charge) may be further increased by coating the surface of the nanoporous core compound with the particle selected from a metal hydroxide particle, a metal oxide particle, and a combination thereof. The nanoporous material may have a surface charge of about −30 mV to about −50 mV at a pH of 8.4. When the coated nanoporous core compound having the surface charge within the above range is applied to a separation membrane, the salt rejection rate may be improved.

The particle selected from a metal hydroxide particle, a metal oxide particle, and a combination thereof may be coated in an amount of about 0.01 mole to about 0.1 mole based on 1 mole of the nanoporous core compound. When the coating is performed within the above range, the surface charge of the nanoporous material may be increased to a desired range.

The metal hydroxide particle or metal oxide particle may be represented by $M_x(OH)_y$, $MO(OH)_y$, or $M_xO_y$, wherein M is a metal or a semi-metal. M may be selected from a Group 13 element of the periodic table (IUPAC) selected from Ga, In, Tl, and a combination thereof; a Group 14 element of the periodic table (IUPAC) selected from Si, Ge, Sn, and a combination thereof; a transition element selected from Mn, Fe, V, Co, Ni, Cu, Zn, Ti, and a combination thereof; and a combination thereof, but is not limited thereto. The variables, x and y, are determined by a valence of M.

The nanoporous material may be manufactured by a method that includes dispersing a precursor for the particle selected from a metal hydroxide particle, a metal oxide particle, and a combination thereof, and a nanoporous core compound in a solvent to prepare a mixture; adding a solution including a pH controlling agent dissolved therein to the mixture in a dropwise fashion; and separating the resulting material followed by drying to obtain a nanoporous core compound coated with a metal hydroxide particle, or separating the resulting material followed by drying and heat-treating to obtain a nanoporous core compound coated with a metal oxide particle. The precursor for the particle selected from a metal hydroxide particle, a metal oxide particle, and a combination thereof may be a salt of a metal selected from a Group 13 element, a Group 14 element, a transition element, and a combination thereof.

The salt may be an inorganic salt or an organic salt, for example, a halide such as chloride, fluoride, and the like; nitrate; sulfate; carbonate; oxalate; phosphate; hydroxide; acetate; citrate; hydrates thereof; and the like. For example, when the metal is iron (Fe), the salt may be $FeCl_3$, $FeCl_3 \cdot 6H_2O$, $Fe(NO_3)_3$, and the like.

The nanoporous core compound may be the same as described in connection with the semi-permeable film.

The solvent may include acetone; acids such as acetic acid, trifluoroacetic acid (TFA), and the like; alcohols such as methanol, isopropanol, 1-methoxy-2-propanol, ethanol, terpineol, and the like; oxygen-containing C2 to C10 cyclic compounds such as tetrahydrofuran (THF), 1,4-dioxane, and the like; pyridine, and the like; heteroatom-containing C1 to C10 aromatic compounds wherein the heteroatom is N, O, or S; halogen compounds such as chloroform, methylenechloride, and the like; aprotic polar compounds such as dimethyl formamide (DMF), dimethyl acetamide (DMAC), dimethylsulfoxide (DMSO), N-methyl-2-pyrrolidone (NMP), and the like; acetates such as 2-butoxyethylacetate, 2-(2-butoxyethoxy)ethylacetate, and the like.

The pH controlling agent may include an alkali metal hydroxide such as LiOH, NaOH, KOH, and the like, or $NH_4OH$ and the like, but is not limited thereto. According to a non-limiting embodiment, the solution in which the pH controlling agent is dissolved may be dripped to provide the resulting mixture having a pH of about 7 to about 10. According to another non-limiting embodiment, the solution in which the pH controlling agent is dissolved may be dripped to provide the resulting mixture having a pH of about 8 to about 9.

After the solution in which the pH controlling agent is dissolved is dripped, a process of separating the resulting material may be performed through a centrifugation process or a filtering process using a filter. However, it should be understood that the process of separating the resulting material is not limited to a specific process.

The drying process may be a heating process, or may be a freeze drying process. The drying process may be performed at about 80° C. to about 150° C. When the drying process is a freeze drying process, the nanoporous core compound may be prevented from being aggregated. The drying process may be performed from about 8 hours to about 12 hours.

The heat treatment process for obtaining the metal oxide particle may be performed at about 400° C. to about 550° C. The heat treatment process may also be performed from about 3 hours to about 8 hours.

The nanoporous material may be applicable to fabrication of a semi-permeable film. FIG. 1 is a schematic view of a semi-permeable film 100 according to a non-limiting embodiment. Referring to FIG. 1, the semi-permeable film 100 include a nanoporous material 101 dispersed in a polymer matrix 103.

The polymer matrix 103 may include a polymer selected from polyamide, cross-linked polyamide, polyamide-hydrazide, poly(amide-imide), polyimide, poly(allylamine)hydrochloride/poly(sodium styrenesulfonate) (PAH/PSS), polybenzimidazole, sulfonated poly(arylene ethersulfone), and a combination thereof. Herein, the arylene may be C6 to C18 arylene.

The semi-permeable film may be manufactured by mixing the nanoporous material 101 with a monomer for preparing a polymer and polymerizing the monomer to form the polymer matrix 103.

When the polymer matrix 103 is polyamide, it may be a polymer of a first monomer of polyamine and a second monomer of multi-functional acyl halide.

The first monomer may be selected from C6 to C30 aromatic polyamine, C1 to C30 aliphatic polyamine, and a combination thereof. The C6 to C30 aromatic polyamine may include diaminobenzene, triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, xylylene diamine, and a combination thereof. Non-limiting examples of the C1 to C30 aliphatic polyamine include ethylenediamine, propylenediamine, piperazine, tris(2-diaminoethyl)amine), and a combination thereof.

The second monomer of multi-functional acyl halide may be selected from trimesoyl chloride (TMC), trimellitic chloride, isophthaloyl chloride, terephthaloyl chloride, and a combination thereof.

The monomer may be properly selected according to the polymer of the polymer matrix 103 by a person ordinarily skilled in this art.

The semi-permeable film 100 may be manufactured by a process that includes coating a substrate with a first solution including a first monomer dissolved in a first solvent; coating the substrate coated with the first solution with a second solution including a second monomer dissolved in a second solvent, and performing interface polymerization of the first monomer and the second monomer. The nanoporous material 101 may be included in either of the first solution or the second solution or both, and may be dispersed in the polymer matrix 103 that is formed through interface polymerization that is performed at the interface between the first solution and the second solution.

The substrate may be a glass plate, or a woven fabric or a non-woven fabric including a polymer fiber, for example a polyester fiber, but is not limited thereto. The woven fabric or non-woven fabric may be included in the separation membrane as a support of the semi-permeable film 100.

The first solvent and the second solvent have a non-miscibility with each other. In one non-limiting embodiment, the first solvent may be a polar solvent selected from water, acetonitrile, dimethyl formamide, and a mixture thereof, and the second solvent may be a nonpolar solvent selected from C5 to C10 aromatic hydrocarbon (e.g., xylene, toluene, and the like), dimethyl sulfoxide, dimethylacrylamide, methylpyrrolidone, and a mixture thereof.

According to one non-limiting embodiment, since the nanoporous material 101 has a negative surface charge, it may be dispersed in a solution including a nonpolar solvent.

When the nanoporous material 101 is mixed with the first solvent or the second solvent, a treatment such as an ultrasonic wave treatment or agitation may be further performed to help disperse the nanoporous material 101 therein before the nanoporous material 101 is mixed with the first solution or the second solution.

Although the process of coating the first solution and the second solution is not limited to a specific process, it may be performed through a dipping process, a spin coating process, a wet spinning process, and the like.

A semi-permeable film 100 is manufactured by interface-polymerizing the first monomer and the second monomer and then dipping them in water of about 90 to about 100° C. to clean them.

The semi-permeable film 100 may be applied to a water treatment separation membrane.

Figure 2:
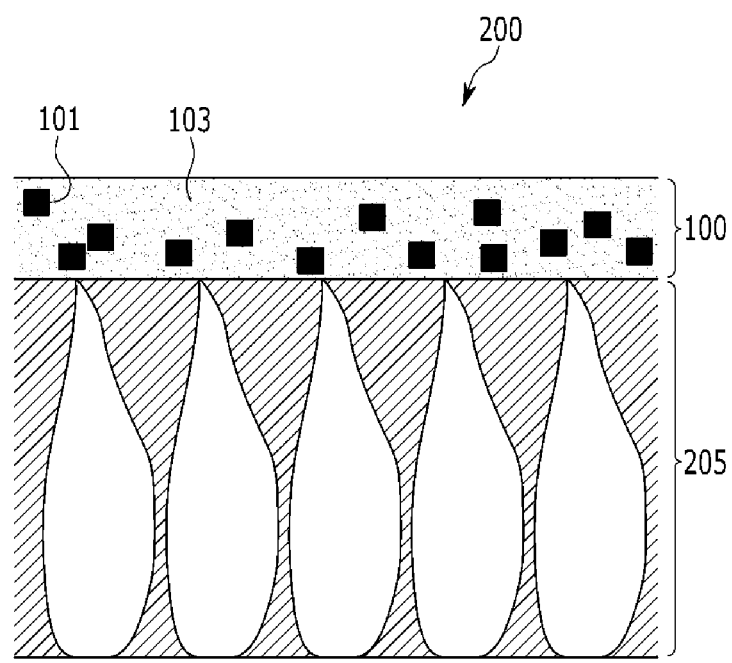
FIG. 2 is a schematic view a separation membrane including a semi-permeable film supported by a porous support.

According to another non-limiting embodiment, the semi-permeable film 100 may be disposed on a porous support. FIG. 2 is a schematic view of a separation membrane 200 including the semi-permeable film 100 supported by a porous support 205. As shown in FIG. 2, the semi-permeable film 100 is disposed on the porous support 205. The porous support 205 may include a polymer selected from a polysulfone-based polymer such as polysulfone, polyethersulfone, poly(ethersulfone ketone), and the like; a poly(meth)acrylonitrile polymer such as polyacrylonitrile, polymethacrylonitrile, and the like; a polyolefin-based polymer such as polyethylene, polypropylene, polystyrene, and the like; polycarbonate; polyalkylene terephthalate such as polyethylene terephthalate, polybutylene terephthalate, and the like; a polyimide-based polymer; a polybenzimidazole-based polymer; a polybenzthiazole-based polymer; polybenzoxzole-based polymer; a poly epoxy-based polymer; a polyphenylenevinylene-based polymer; a polyamide-based polymer; a cellulose-based polymer; polyvinylidene fluoride (PVDF); polytetrafluoroethylene (PTFE); polyvinylchloride (PVC); and a combination thereof.

The nanoporous material 101 may be included in an amount of about 0.01 to about 8 wt % based on the total amount of the semi-permeable film 100. According to another non-limiting embodiment, the nanoporous material 101 may be included in an amount of about 0.1 to about 5 wt %. Within the above range, the salt rejection rate and the elution rate of the semi-permeable film 100 may be improved.

The semi-permeable film 100 may have a thickness of about 0.01 to about 100 micrometers. According to a non-limiting embodiment, the semi-permeable film 100 may have a thickness of about 0.02 to about 50 micrometers. According to yet another non-limiting embodiment, the semi-permeable film 100 may have a thickness of about 0.03 to about 25 micrometers. With the thickness of the above range, the separation membrane may have an improved salt rejection rate and permeation elution rate.

The porous support 205 may have a thickness of about 25 to about 250 micrometers. With the above range, the separation membrane may maintain the elution rate and an appropriate level of strength simultaneously. Also, relatively small pores may be formed in a part of the porous support 205 contacting the semi-permeable film 100.

The semi-permeable film 100 serves as an active layer in charge of a separation function of the separation membrane 200, and the porous support 205 serves as a support layer of the separation membrane 200.

The separation membrane 200 including the semi-permeable film 100 may be used as a separation membrane for water treatment. The separation membrane for water treatment may be a microfiltration membrane, an ultrafiltration membrane, a nanofiltration membrane, a reverse osmotic membrane, or a forward osmotic membrane according to its usage purpose. The type of separation membrane may be determined according to the size of the target separation particle. The process of forming the separation membrane of the desired type is not limited to a specific one, and the separation membrane may be formed by controlling the pore size and pore structure through a known method.

The separation membrane for water treatment may be, for example, a microfiltration membrane, an ultrafiltration membrane, a nanofiltration membrane, a reverse osmotic membrane, or a forward osmotic membrane. The separation membrane for water treatment may be used with diverse kinds of water treatment equipment. For example, the separation membrane for water treatment may be used with reverse osmosis water treatment equipment or forward osmosis water treatment equipment, but the scope of the disclosure is not limited to this.

The water treatment equipment may be used for, for example, water purification, waste water treatment and reuse, and desalination of sea water.

Hereinafter, various embodiments are illustrated in more detail with reference to the following examples. However, it should be understood that the following are merely example embodiments and are not to be construed as limiting.

EXAMPLE 1

Preparation of Nanoporous Material 0.0002 mol of NaY zeolite ($Na_{56}[(AlO_2)_{56}(SiO_2)_{136}] \cdot 6H_2O$, surface pore size: 0.74 nm, internal pore size: 1.3 nm, and particle diameter: 200 nm) and 0.01 mol of $FeCl_3 \cdot 6H_2O$ are added to water, and 860 ml of 0.5M NaOH aqueous solution is dripped therein for 5 minutes. The resultant solution is allowed to stand for 180 minutes for reaction, and is centrifuged and then freeze-dried for 24 hours to prepare zeolite coated with iron oxyhydroxide (FeO(OH)). The coated iron oxyhydroxide (FeO(OH)) content is 0.07 mol based on 1 mol of the NaY zeolite.

EXAMPLE 2

Preparation of Nanoporous Material

Zeolite coated with iron oxide ($Fe_2O_3$) is prepared by performing heat treatment on the zeolite coated with iron oxyhydroxide according to Example 1 at 450° C. for 5 hours. The coated iron oxide ($Fe_2O_3$) content is 0.07 mol based on 1 mol of the NaY zeolite.

Figure 3:
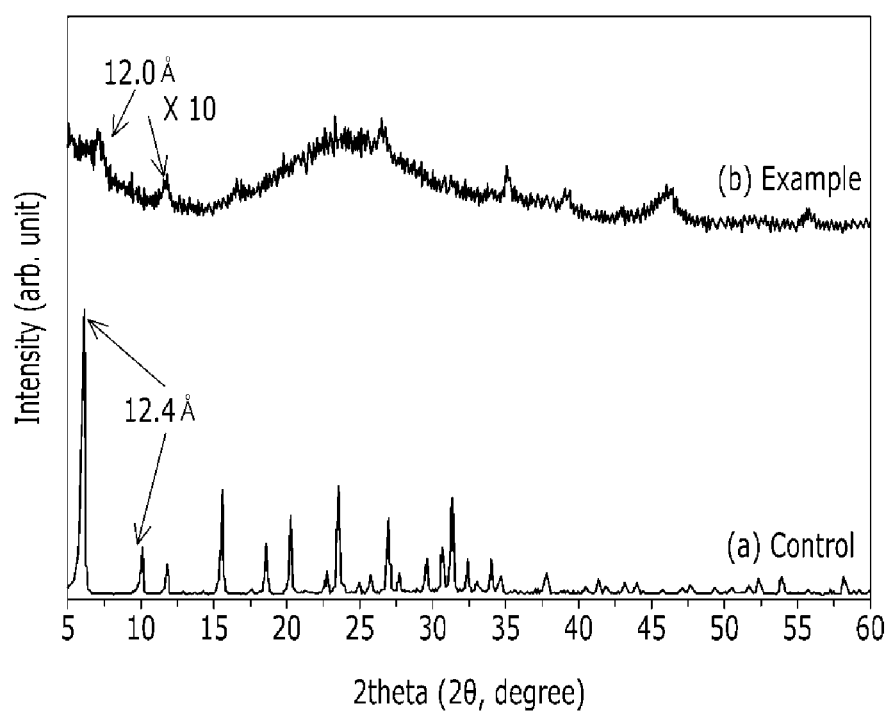
FIG. 3 is a graph showing an X-ray diffraction analysis result of (a) $Na_{56}[(AlO_2)_{56}(SiO_2)_{136}] \cdot 6H_2O$ zeolite and (b) surface-coated zeolite according to Example 1.

X-ray diffraction analysis results of $Na_{56}[(AlO_2)_{56}(SiO_2)_{136}] \cdot 6H_2O$ zeolite (control (a)) and the surface-coated zeolite (b) according to Example 1 are shown in FIG. 3. During the X-ray diffraction analysis, the light source is Cu K α ray and the scan rate is 5 degree/min. In FIG. 3, the X-ray diffraction analysis result of the zeolite (a) shows the intensity of vertical axis enlarged 10 times to better compare the peaks. Although a peak (12.0 angstrom (Å)) indicating the pore size of the surface-coated zeolite (b) according to Example 1 is slightly decreased compared with a peak (12.4 angstrom (Å)) indicating the pore size of the zeolite (a), they are almost the same. Therefore, it may be seen that the surface coating of FeO(OH) scarcely affects the pore size.

Figure 4:
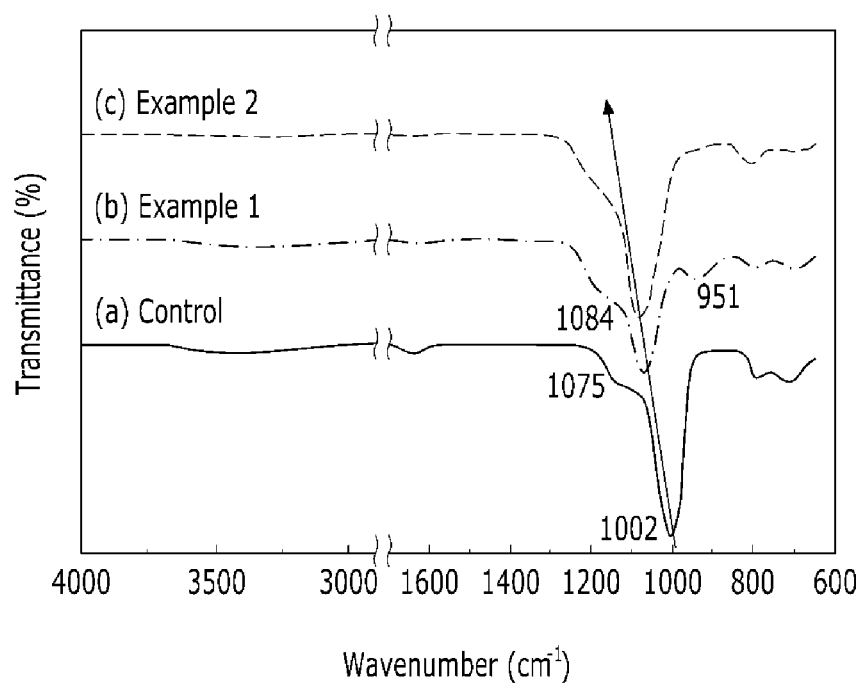
FIG. 4 shows attenuated total reflection-Infrared spectroscopy (ATR-IR) analysis results of (a) $Na_{56}[(AlO_2)_{56}(SiO_2)_{136}] \cdot 6H_2O$ zeolite, (b) surface-coated zeolite according to Example 1, and (c) surface-coated zeolite according to Example 2.

FIG. 4 shows attenuated total reflection-infrared spectroscopy (ATR-IR) analysis results of $Na_{56}[(AlO_2)_{56}(SiO_2)_{136}] \cdot 6H_2O$ zeolite (control (a)), the surface-coated zeolite (b) according to Example 1, and the surface-coated zeolite (c) according to Example 2. In FIG. 4, the $Na_{56}[(AlO_2)_{56}(SiO_2)_{136}] \cdot 6H_2O$ zeolite shows a stretching peak of Si—O bond at 1002 $cm^{-1}$, the surface-coated zeolite according to Example 1 shows a peak at 1075 $cm^{-1}$, and the surface-coated zeolite according to Example 2 shows a peak at 1084 $cm^{-1}$. It may be seen from the results that the surface of the zeolite is coated with Fe because the wavelength shifts from 1002 $cm^{-1}$ (a) to 1075 $cm^{-1}$ (b) and 1084 $cm^{-1}$ (c) toward higher energy.

The surface charge amounts of $Na_{56}[(AlO_2)_{56}(SiO_2)_{136}] \cdot 6H_2O$ zeolite (control), the surface-coated zeolite according to Example 1, and the surface-coated zeolite according to Example 2 are measured and shown in the following Table 1. The surface charge amounts are measured based on the Helmholtz-Smouluchowski (H-S) Equation at a pH of 8.4 by using a 1 mM KCl aqueous solution.

TABLE 1

|  | Control | Example 1 | Example 2 |
| --- | --- | --- | --- |
| Surface charge | −24.1 mV | −39.4 mV | −38.6 mV |

EXAMPLE 3

Fabrication of Separation Membrane

A first solution is prepared by dissolving m-phenylenediamine in water in a concentration of 3.5 wt %, and a second solution is prepared by dissolving trimesoyl chloride in Isopar-G solvent (KB Chem. Co., LTD.) in a concentration of 0.14 wt %.

A polysulfone porous support coated with the first solution is prepared by dipping a polysulfone porous support in the first solution, rolling it, and removing water drops from the surface of the polysulfone porous support. The polysulfone porous support coated with the first solution is dipped in the second solution. The surface-coated zeolite according to Example 1 is added to Isopar-G solvent, goes through an ultrasonic wave treatment, and then added to the second solution. After 2 minutes passes, a separation membrane where the semi-permeable film including the nanoporous material according to Example 1 dispersed in the polyamide polymer matrix is formed on top of the polysulfone porous support is manufactured by dipping the resultant in a 95° C. circulation water bath and cleansing it. The nanoporous material is included in an amount of 0.1 wt % based on the total amount of the semi-permeable film.

EXAMPLE 4

Fabrication of Separation Membrane

A separation membrane is manufactured according to the same method as Example 3, except that the nanoporous material according to Example 2 is used instead of the nanoporous material according to Example 1.

COMPARATIVE EXAMPLE 1

Fabrication of Separation Membrane

A separation membrane is manufactured according to the same method as Example 3, except that the nanoporous material according to Example 1 is not used.

COMPARATIVE EXAMPLE 2

Fabrication of Separation Membrane

A separation membrane is manufactured according to the same method as Example 3, except that $Na_{56}[(AlO_2)_{56}(SiO_2)_{136}] \cdot 6H_2O$ zeolite is used instead of the nanoporous material according to Example 1.

Figure 5:
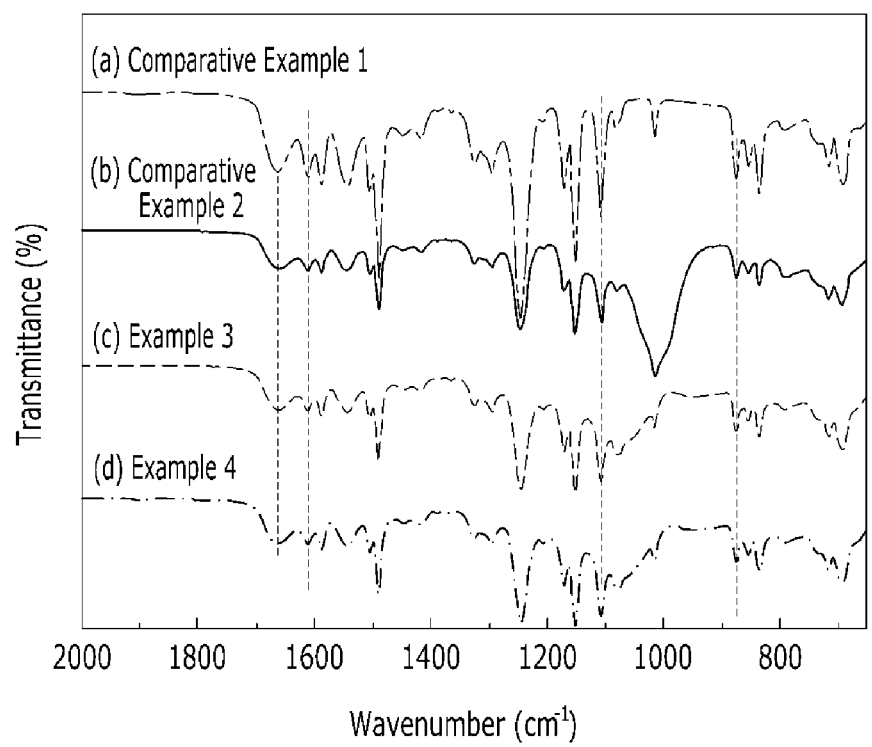
FIG. 5 shows ATR-IR analysis results of the separation membranes ((c) and (d)) prepared according to Examples 3 and 4, and the separation membranes ((a) and (b)) prepared according to Comparative Examples 1 and 2.

FIG. 5 shows ATR-IR analysis results of the separation membranes manufactured according to Examples 3 and 4 and the separation membranes manufactured according to Comparative Examples 1 and 2. In FIG. 5, a peak (b) of the separation membrane manufactured according to Comparative Example 2 has a different peak size at about 1000 $cm^{-1}$ from the peak (a) of the separation membrane manufactured according to Comparative Example 1, but the peaks (c) and (d) of the separation membranes manufactured according to Examples 3 and 4 have a similar peak shape to that of the separation membrane manufactured according to Comparative Example 1. This signifies that the polyamide polymer matrix and the zeolite are combined well in the separation membranes according to Examples 3 and 4.

The surface charge amounts of the separation membranes according to Examples 3 and 4 and separation membranes according to Comparative Examples 1 and 2 are measured and shown in the following Table 2. The surface charge amounts are measured in 1 mM KCl aqueous solution at 25° C.

TABLE 2

| | Example 3 | Example 4 | Comparative Example 1 | Comparative Example 2 |
|---|---|---|---|---|
| Surface charge | −32.8 mV | −24.3 mV | −15.7 mV | −14.5 mV |

It may be seen from the result of Table 2 that the surface charge amounts of the separation membranes manufactured according to Examples 3 and 4 are relatively high while the surface charge amount of the separation membrane according to Comparative Example 2 is less than that of Comparative Example 1.

Salt Rejection Rate

The salt rejection rates of the separation membranes manufactured according to Examples 3 and 4 and the separation membranes manufactured according to Comparative Examples 1 and 2 are measured and shown in the following Table 3. First, the separation membranes are fixed in cells having an effective area of 60 $cm^2$, and a 32000 ppm NaCl solution is supplied at room temperature (about 25° C.). The cross flow rate is 21.4 cm/s. The separation membranes are consolidated at a 60 bar for 2 hours, and their salt rejection rate is measured based on the following Equation 1.

$$R = 1 - (c_p/c_b) \quad \text{[Equation 1]}$$

In Equation 1, R denotes a salt rejection rate, $c_b$ denotes a salt concentration of bulk raw water (feed), and $c_p$ denotes a salt concentration of permeated water.

TABLE 3

| Separation membrane | Operating pressure | Salt rejection rate |
|---|---|---|
| Example 3 | 55 bar | 99.3% |
| Example 4 | 55 bar | 99.2% |
| Comparative Example 1 | 55 bar | 98.7% |
| Comparative Example 2 | 55 bar | 98.9% |

It may be seen from Table 3 that the salt rejection rates of the separation membranes according to Examples 3 and 4 are higher than the salt rejection rates of the separation membranes according to Comparative Examples 1 and 2.

Elution Rate

The elution rates of the separation membranes manufactured according to Examples 3 and 4 and the separation membranes manufactured according to Comparative Examples 1 and 2 are measured. First, the separation membranes are fixed in cells having an effective area of 60 $cm^2$, and a NaCl solution of 32000 ppm is supplied at room temperature (about 25° C.). The cross flow speed is 21.4 cm/s. The separation membranes are consolidated at a 60 bar for 2 hours. The elution rate measurement results of the separation membrane manufactured according to Example 3 and the separation membranes manufactured according to Comparative Examples 1 and 2 are shown in the following Table 4.

TABLE 4

| Separation membrane | Operating pressure | Elution rate (LMH) |
|---|---|---|
| Example 3 | 55 bar | 42.2 |
| Comparative Example 1 | 55 bar | 20.8 |
| Comparative Example 2 | 55 bar | 26.1 |

In Table 4, LMH (L/$m^2 \cdot$hour) denotes an amount of water permeating through a unit area of a membrane per unit time. L denotes the amount (liters) of water permeating through the membrane, while M denotes the area ($m^2$) of the membrane and H denotes permeating time (hours). That is, LMH is an estimation unit for determining how many liters of water permeate through the membrane of an area of 1 $m^2$ in one hour. As shown in Table 4, an elution rate of the separation membrane according to Example 3 is improved compared to those of the separation membrane according to Comparative Examples 1 and 2.

While this disclosure has been described in connection with what is presently considered to be various example embodiments, it is to be understood that the disclosure is not limited to the disclosed embodiments, but, on the contrary, is intended to cover various modifications and equivalent arrangements included within the spirit and scope of the appended claims.

<Description of Symbols>

| 100: semi-permeable film | 101: nanoporous material |
|---|---|
| 103: polymer matrix | 200: separation membrane |
| 205: porous support | |

What is claimed is:
1. A semi-permeable film, comprising:
a polymer matrix; and
a nanoporous material within the polymer matrix, the nanoporous material including a nanoporous core and a coating layer on a surface of the nanoporous core, the coating layer including a particle selected from a metal hydroxide particle, a metal oxide particle, and a combination thereof.

2. The semi-permeable film of claim 1, wherein the nanoporous core is selected from zeolite, hydrotalcite, kaohnite, mellite, montmorillonite, saponite, and a combination thereof.

3. The semi-permeable film of claim 2, wherein the zeolite is selected from zeolite-A, ZSM-5, zeolite-X, zeolite-Y, zeolite-L, LTA (Linde type A) zeolite, RHO zeolite, PAU zeolite, KFI zeolite, and a combination thereof.

4. The semi-permeable film of claim 2, wherein the zeolite is represented by $M^{m+}_{x/m}[Si_{1-x}Al_xO_2] \cdot yH_2O$, wherein $M^{m+}$ is a cation having a valence of m, x is greater than 0 and less than or equal to 1, and y represents the number of molecules of adsorbed water per unit cell and is a natural number of greater than 0.

5. The semi-permeable film of claim 2, wherein the zeolite is represented by $Na_a[(AlO_2)_a(SiO_2)_b] \cdot yH_2O$, wherein b/a is greater than or equal to 1, and y is the number of water molecules per unit cell.

6. The semi-permeable film of claim 1, wherein the nanoporous material has an average pore size of about 0.3 nm to about 1.2 nm.

7. The semi-permeable film of claim 1, wherein the nanoporous material has a surface charge of about −30 mV to about −50 mV at a pH of 8.4.

8. The semi-permeable film of claim 1, wherein the nanoporous material has a specific surface area of about 11 m²/g to about 626 m²/g.

9. The semi-permeable film of claim 1, wherein the particle of the coating layer is present in an amount of about 0.01 mole to about 0.1 mole based on 1 mole of the nanoporous core.

10. The semi-permeable film of claim 1, wherein the metal hydroxide particle or metal oxide particle, and a combination thereof is represented by $M_x(OH)_y$, $MO(OH)_y$, or $M_xO_y$, M being selected from a Group 13 element, a Group 14 element, a transition element, and a combination thereof, the Group 13 element selected from Ga, In, Tl, and a combination thereof, the Group 14 element selected from Si, Ge, Sn, and a combination thereof, the transition element selected from Mn, Fe, V, Co, Ni, Cu, Zn, Ti, and a combination thereof, and x and y are determined by a valence of M.

11. The semi-permeable film of claim 1, wherein the nanoporous material is present in an amount of about 0.01 to about 8 wt % based on a total weight of the semi-permeable film.

12. The semi-permeable film of claim 1, wherein the nanoporous material is present in an amount of about 0.1 to about 5 wt % based on a total weight of the semi-permeable film.

13. The semi-permeable film of claim 1, wherein the polymer matrix comprises a polymer selected from polyamide, cross-linked polyamide, polyamide-hydrazide, poly(amideimide), polyimide, poly(allylamine) hydrochloride / poly(sodium styrenesulfonate) (PAH/PSS), polybenzimidazole, sulfonated poly(arylene ethersulfone), and a combination thereof.

14. The semi-permeable film of claim 1, wherein the semipermeable film has a surface charge of about −20 mV to about −35 mV at a pH of 8.4.

15. The semi-permeable film of claim 1, further comprising:
an additive selected from a metal, metal oxide, and a mixture thereof.

16. The semi-permeable film of claim 15, wherein the metal is selected from a Group 13 element, a Group 14 element, a transition element, and a combination thereof, the Group 13 element selected from Ga, In, Tl, and a combination thereof, the Group 14 element selected from Si, Ge, Sn, and a combination thereof, the transition element selected from Mn, Fe, V, Co, Ni, Cu, Zn, Ti, and a combination thereof.

17. The semi-permeable film of claim 15, wherein the additive is present in an amount of about 0.001 to about 0.1 mole based on 1 mole of the nanoporous material.

18. A separation membrane comprising the semi-permeable film according to claim 1.

19. The separation membrane of claim 18, wherein the separation membrane has a surface charge of about −20 mV to about −35 mV at a pH of 8.4.

20. The separation membrane of claim 18, further comprising:
a fabric supporting the semi-permeable film, the fabric including a polymer fiber.

21. The separation membrane of claim 18, further comprising:
a porous support supporting the semi-permeable film, wherein the porous support comprises a polymer selected from a polysulfone-based polymer, a poly(meth)acrylonitrile polymer, a polyolefin-based polymer; polycarbonate; polyalkylene terephthalate; a polyimide-based polymer; a polybenzimidazole-based polymer; a polybenzthiazole-based polymer; a polybenzoxazole-based polymer; a polyepoxy-based polymer; a polyphenylenevinylene-based polymer; a polyamide-based polymer; a cellulose-based polymer; polyvinylidene fluoride (PVDF); polytetrafluoroethylene (PTFE); polyvinylchloride (PVC); and a combination thereof.

22. The separation membrane of claim 18, wherein the separation membrane is a microfiltration membrane, an ultrafiltration membrane, a nanofiltration membrane, a reverse osmotic membrane, or a forward osmotic membrane.

23. A method of manufacturing a separation membrane, comprising:
preparing a nanoporous material including a nanoporous core and a coating layer disposed on a surface of the nanoporous core, the coating layer including a particle selected from a metal hydroxide particle, a metal oxide particle, and a combination thereof;
first coating a substrate with a first solution including a first monomer dissolved in a first solvent to obtain a first coated substrate;
second coating the first coated substrate with a second solution including a second monomer dissolved in a second solvent, the second solvent exhibiting non-miscibility with the first solvent, at least one of the first solution and the second solution including the nanoporous material; and
performing interface polymerization of the first monomer and the second monomer to form a polymer matrix comprising the nanoporous material dispersed therein, thereby obtaining the separation membrane.

24. The method of manufacturing a separation membrane of claim 23, wherein the preparing a nanoporous material includes
dispersing a precursor for the particle and the nanoporous core in a solvent to prepare a mixture;
adding a solution including a pH controlling agent dissolved therein to the mixture in a dropwise fashion to form a resulting material; and
separating the resulting material followed by drying to obtain the nanoporous core coated with the metal hydroxide particle, or separating the resulting material followed by drying and heat-treating to obtain the nanoporous core coated with the metal oxide particle.

25. The method of manufacturing a separation membrane of claim 24, wherein the precursor for the particle is a salt of a metal selected from a Group 13 element, a Group 14 element, a transition element, and a combination thereof.

26. The method of manufacturing a separation membrane of claim 24, wherein the nanoporous core is selected from zeolite, hydrotalcite, kaohnite, mellite, montmorillonite, saponite, and a combination thereof.

27. The method of manufacturing a separation membrane of claim 26, wherein the zeolite is represented by $M^{m+}_{x/m}[Si_{1-x}Al_xO_2] \cdot yH_2O$, wherein $M^{m+}$ is a cation having a valence of m, x is greater than 0 and less than or equal to 1, and y represents the number of molecules of adsorbed water per unit cell and is a natural number of greater than 0.

* * * * *